(12) United States Patent
Katuwal et al.

(10) Patent No.: US 9,905,008 B2
(45) Date of Patent: Feb. 27, 2018

(54) AUTOMATED FUNDUS IMAGE FIELD DETECTION AND QUALITY ASSESSMENT

(71) Applicants: Gajendra Jung Katuwal, Lewisburg, PA (US); John P. Kerekes, Pittsford, NY (US); Rajeev S. Ramchandran, Pittsford, NY (US); Christye P. Sisson, Pittsford, NY (US)

(72) Inventors: Gajendra Jung Katuwal, Lewisburg, PA (US); John P. Kerekes, Pittsford, NY (US); Rajeev S. Ramchandran, Pittsford, NY (US); Christye P. Sisson, Pittsford, NY (US)

(73) Assignees: UNIVERSITY OF ROCHESTER, Rochester, NY (US); ROCHESTER INSTITUTE OF TECHNOLOGY, Rochester, NY (US)

(*) Notice: Subject to any disclaimer, the term of this patent is extended or adjusted under 35 U.S.C. 154(b) by 43 days.

(21) Appl. No.: 14/511,936

(22) Filed: Oct. 10, 2014

(65) Prior Publication Data

US 2015/0104087 A1 Apr. 16, 2015

Related U.S. Application Data

(60) Provisional application No. 61/889,282, filed on Oct. 10, 2013.

(51) Int. Cl.
*G06T 7/00* (2017.01)
*G06T 7/30* (2017.01)
(Continued)

(52) U.S. Cl.
CPC .......... *G06T 7/0024* (2013.01); *G06T 7/0002* (2013.01); *G06T 7/11* (2017.01);
(Continued)

(58) Field of Classification Search
CPC ......... G06T 7/0002; G06T 7/11; G06T 7/194; G06T 7/30; G06T 2207/30041; G06T 2207/30101; G06T 2207/30168
See application file for complete search history.

(56) References Cited

U.S. PATENT DOCUMENTS 7,668,351 B1 * 2/2010 Soliz ................... G06T 7/0091
                                            351/237
8,194,936 B2 * 6/2012 Abramoff .......... G06K 9/00617
                                            351/211
(Continued)

FOREIGN PATENT DOCUMENTS

WO    WO2003030073 A1    4/2003

OTHER PUBLICATIONS

Gegúndez-Arias et al., "A Function for Quality Evaluation of Retinal Vessel Segmentations", Feb. 2012, IEEE Transactions on Medical Imaging, vol. 31, Iss: 2, 231-239.*

(Continued)

*Primary Examiner* — Katrina Fujita
(74) *Attorney, Agent, or Firm* — Bond, Schoeneck & King, PLLC; Joseph Noto

(57) ABSTRACT

A method, system, and computer readable medium which automatically determine the side, field and a level of image quality of fundus images of the retina of a human eye is disclosed. The disclosure combines image processing, computer vision and pattern recognition techniques in a unique way to provide a robust process to identify and grade the quality of fundus images with application to improve efficiency and reduce errors in clinical or diagnostic retinal imaging workflows.

18 Claims, 13 Drawing Sheets

OD3

OD2

OD1

(51) Int. Cl.
    *G06T 7/11* (2017.01)
    *G06T 7/194* (2017.01)
(52) U.S. Cl.
    CPC ............... *G06T 7/194* (2017.01); *G06T 7/30* (2017.01); *G06T 2207/30041* (2013.01); *G06T 2207/30101* (2013.01); *G06T 2207/30168* (2013.01)

(56) References Cited

U.S. PATENT DOCUMENTS

| | | | | |
|---|---|---|---|---|
| 8,483,450 | B1* | 7/2013 | Derakhshani | G06K 9/00597 382/115 |
| 8,721,077 | B2* | 5/2014 | Vermeer | A61B 3/102 351/205 |
| 2011/0275931 | A1* | 11/2011 | Debuc | A61B 3/102 600/425 |
| 2012/0195481 | A1* | 8/2012 | Gonzalez Penedo | G06K 9/0061 382/128 |
| 2012/0229763 | A1* | 9/2012 | Suehira | A61B 3/102 351/206 |
| 2015/0116660 | A1* | 4/2015 | Matsumoto | A61B 3/102 351/206 |
| 2015/0161785 | A1* | 6/2015 | Xu | A61B 3/117 382/128 |
| 2015/0265144 | A1* | 9/2015 | Burlina | A61B 3/10 351/206 |

OTHER PUBLICATIONS

Bartling et al., "Automated quality evaluation of digital fundus photographs." Acta ophthalmologica 87.6 (2009): 643-647.*

Nirmala et al., "Performance evaluation of distortion measures for retinal images." Performance Evaluation 17.6 (2011), 17-23.*

Paulus et al. "Automated quality assessment of retinal fundus photos." International journal of computer assisted radiology and surgery 5.6 (2010): 557-564.*

Yu et al. "Automated image quality evaluation of retinal fundus photographs in diabetic retinopathy screening." Image analysis and interpretation (SSIAI), 2012 IEEE southwest symposium on. IEEE, 125-128.*

Blodi et al. "Standard Care vs Corticosteroid for Retinal Vein Occlusion (SCORE) Study System for Evaluation of Stereoscopic Color Fundus Photographs and Fluorescein Angiograms: SCORE Study Report 9." Archives of ophthalmology 128.9 (2010): 1140.*

Kaur et al. "Automated detection of diabetic retinopathy using fundus image analysis." International Journal of Computer Science and Information Technologies 3 (2012): 4794.*

López-Gil et al. "Retinal image quality during accommodation." Ophthalmic and Physiological Optics 33.4 (Jul. 2013): 497-507.*

Nayak et al. "Automated diagnosis of glaucoma using digital fundus images." Journal of medical systems 33.5 (2009): 337.*

Niemeijer et al. "Fast detection of the optic disc and fovea in color fundus photographs." Medical image analysis 13.6 (2009): 859-870.*

Hunter, A., et al., An Automated Retinal Image Quality Grading Algorithm, 33rd Annual International Conference of the IEEE EMBS, Boston Massachusetts, Aug. 30-Sep. 3, 2011, pp. 5955-5958.

Niemeijer, M., et al, Image Structure Clustering for Image Quality Verification of Color Retina Images in Diabetic Retinopathy Screening, Medical Image Analysis 10 (2006) 888-898.

Fleming A., et al., Automated Assessment of Diabetic Retinal Image Quality Based on Clarity and Field Definition, Investigative Ophthalmology & Visual Science, Mar. 2006, vol. 47, No. 3, pp. 1120-1125.

Soliz, P., et al., Computer-Aided Methods for Quantitative Assessment of Longitudinal Changes in Retinal Images Presenting with Maculopathy, Medical Imaging 2002: Visualization, Image-Guided Procedures, and Display Proceedings of SPIE, vol. 4681 (2002) pp. 159-170.

Giancardo, L., et al., Quality Assessment of Retinal Fundus Images using Elliptical Local Vessel Density, New Developments in Biomedical Engineering, Domenico Campolo (Ed.), ISBN: 978-953-7619-57-2, available from: http://www.intechopen.com/books/new-developments-in-biomedical-engineering/quality-assessment-of-retinal-fundus-images-using-ellipitcal-local-vessel-density.

* cited by examiner

AUTOMATED FUNDUS IMAGE FIELD DETECTION AND QUALITY ASSESSMENT

CROSS REFERENCE

This application claims the benefit of the filing date of U.S. Provisional Patent Application Ser. No. 61/889,282, filed Oct. 10, 2013, the disclosure of which is incorporated herein by reference in its entirety.

FIELD

This disclosure relates to a method, computer readable medium, and system for automated fundus image field detection and quality assessment.

BACKGROUND

Diabetic eye disease and namely retinopathy (DR), a complication of diabetes mellitus, is the leading cause of blindness in the US working age population (age 20-74 years) and thus has significant socio-economic consequences. There is abundant evidence that blindness and visual loss in these patients can be prevented through annual screening and early diagnosis. The number of patients with diabetes is increasing rapidly and is estimated to be nearly 26 million in the US and about 8 million of these individuals have DR. More than 50% of these are underserved who do not receive regular eye examination by eye care providers. The burden on the medical system to serve this segment of population can be significant. Fundus images of the human retina are an important diagnostic tool to detect and monitor the progression of many retinal and optic nerve diseases including age-related macular degeneration, diabetic retinopathy, and glaucoma. Photographic systems for fundus imaging are common in ophthalmological practices, and are increasingly becoming available in primary care clinics, including those serving poor, rural or remote populations. In this latter case, the images are often acquired by nonspecialists and then later transmitted over secure digital networks to physicians for further screening and diagnosis. This store and forward system is referred to as teleophthalmology. Teleophthalmology based diabetic eye disease screening programs based in primary care clinics have helped to increase the rates of annual eye screenings for vulnerable populations by over 50%. Due to the practical delays between image acquisition and specialist grading, a problem arises when the remote ophthalmologist or eye care provider determines the collected images are of insufficient quality for screening, but the patient has already left the clinic due to the store and forward nature of image analysis. Examples of insufficient quality include improper positioning of the image field, out-of-focus images, or insufficient illumination, which would result in a lack of image data for a given area of the retina. In remote rural areas or other underserved regions, this delay in quality assessment could introduce significant additional burden for the patient requiring a return trip to the clinic. This additional visit may be too high a barrier especially for the underserved. Without a proper screening, patients may continue with undiagnosed disease and miss out on early treatment. Thus it would be desirable if an assessment of fundus image quality could occur at the time of image capture, allowing the system operator to collect new images with sufficient quality for diagnosis. While training the operators is one approach to this assessment, there may be limitations in the ability of the personnel to be trained, or subtleties in the images that suggest an automated system may be most desirable. The overarching goal is to make the early detection and treatment of DR more accessible by improving efficiency in the acquisition of quality retinal images. Achieving consistent quality for retinal images is highly sought after by regulators evaluating the safety and efficacy of such novel methods of improving access to quality health care, such as the FDA.

SUMMARY

In accordance with one aspect illustrated herein, there is provided a method for determining the sufficiency of a set of images for use in retinal screening, including identifying the eye and field of each image from a plurality of retinal images including a plurality of different fields; determining the quality of each identified image; and assigning a comprehensive image quality metric to a set of images from the plurality of retinal images, wherein the set of images is associated with the same eye.

In accordance with another aspect illustrated herein, there is provided a computer readable medium having stored thereon instructions for determining the sufficiency of a set of images for use in retinal screening, including machine executable code which when executed by at least one processor, causes the processor to perform actions including identifying the eye and field of each image from a plurality of retinal images including a plurality of different fields; determining the quality of each identified image; and assigning a comprehensive image quality metric to a set of images from the plurality of retinal images, wherein the set of images is associated with the same eye.

In accordance with another aspect illustrated herein, there is provided a system for determining the sufficiency of a set of images for use in retinal screening, including a processor which performs the actions including identifying the eye and field of each image from a plurality of retinal images including a plurality of different fields; determining the quality of each identified image; and assigning a comprehensive image quality metric to a set of images from the plurality of retinal images, wherein the set of images is associated with the same eye.

These and other aspects illustrated herein will become apparent upon a review of the following detailed description and the claims appended thereto.

DETAILED DESCRIPTION

Automated fundus image field detection and quality assessment is disclosed. Illustrated herein are a method, computer readable medium, and system for determining the sufficiency of a set of fundus images for diagnostic use, as for example, in chorioretinal and optic nerve (retinal) screening in the diagnosis of choroidal, retinal or optic nerve disease in the captured image. The method, medium, and system solve the problems of field detection and quality assessment of fundus images in an automated approach which does not require any algorithm training or parameter setting by the operator. In an embodiment, the method includes automated individual image field and side (i.e., left or right eye) detection for a set of fundus images; automated individual image quality assessment; and comprehensive image quality assessment of the set of fundus images associated with the same eye. The method utilizes the physiological characteristics of human retinas including the locations of the optic disc and the macula, and the presence of symmetry in the retinal blood vessel structure.

Typically, for diagnostic purposes, a plurality of retinal images include a set of three image fields for the left eye and a set of three image fields for the right eye. The set of three image fields typically includes, for example, a disc centered field, macula centered field, and temporal to macula field. As these three image fields are acquired by the camera operator, it is desirable to confirm the identity of the image fields prior to assessing the image quality.

Figure 1:
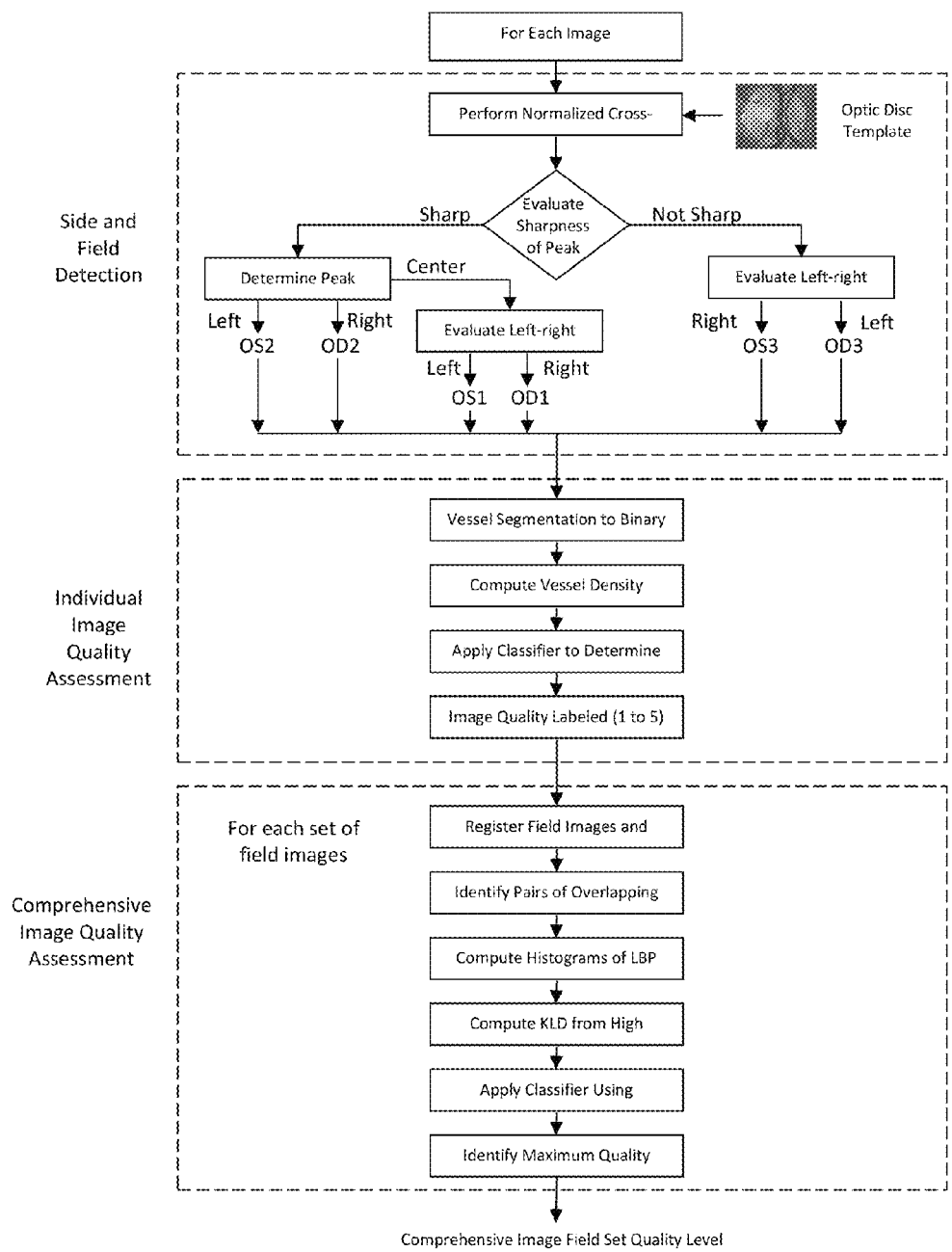
FIG. 1 is a flowchart of an embodiment of the method disclosed herein.

In an embodiment, a method for determining the sufficiency of a set of images for use in retinal screening includes identifying the eye and field of each image from a plurality of retinal images including a plurality of different fields; determining the quality of each identified image; and assigning a comprehensive image quality metric to a set of images, wherein the set of images is associated with the same eye. FIG. 1 illustrates a flow chart of an embodiment of the method. The method sequentially evaluates each field image to determine the side (right or left eye) and field label (1, 2, or 3); assesses (grades) the quality (for example, on an increasing quality scale from 1 to 5) of each image; and assesses in a comprehensive manner the quality of the set of three field images associated with the same eye. The grades are assigned according to selected criteria. In an embodiment, the selected criteria are focus, amount and number of artifacts, and amount of retina visible for the field, although other criteria are possible.

Figure 2:
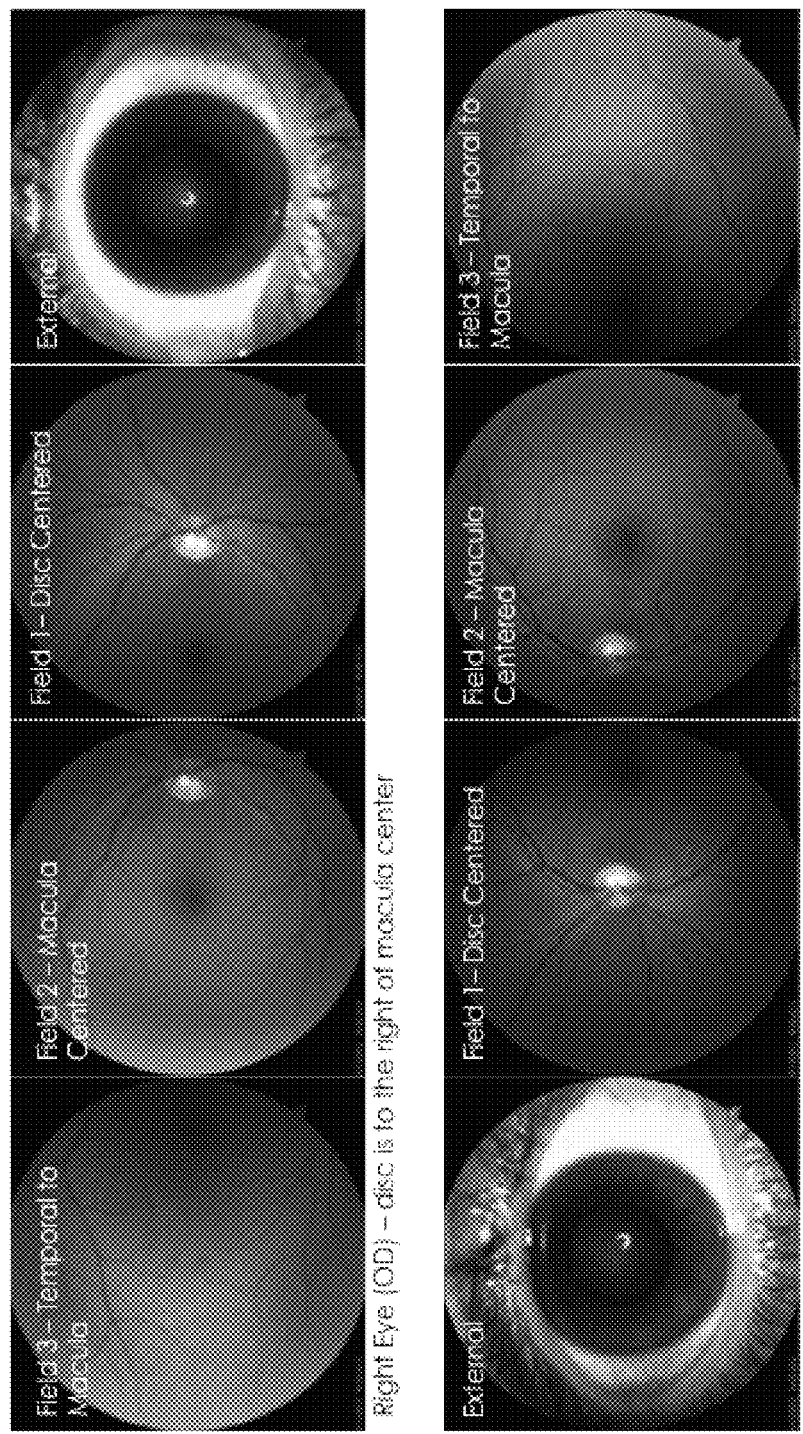
FIG. 2 is a picture of two sets of fundus images.

The images of the patient's retina, or any comparable representation of such are captured as color or monochrome digital images taken by a fundus camera, for example, including multispectral or hyperspectral imaging cameras. Typically a set of four fundus images is acquired for each eye, as shown in FIG. 2. These include three fields, known as Field 1, Field 2, and Field 3, and an external image for each eye. Field 1 is optic disc centered, Field 2 is macula centered, and Field 3 covers the area from the temporal side to the macula. The three fields are typically used diagnostically to acquire a more complete view of the retina related structures of the fundus. The field images are labeled by their side as right (OD) or left (OS). Thus, two sets of internal retinal images per patient can be identified as OD1, OD2, OD3, OS1, OS2, and OS3.

Identifying the eye and field of each image from a plurality of retinal images including a plurality of different fields can be performed by determining where physiological landmarks are located in each image. The physiological landmarks can include the optic disc and macula.

Typically, at time of acquisition the field images are identified as to their field placement and whether they are from the right or left eye. Automated fixation systems help to minimize user error, but in the event a patient doesn't fixate properly, errors can still occur. An automated method for determining the actual field placement is provided as illustrated herein.

The field and side detection of the method automatically determines the side and field of each retinal image. If the image is made up of multiple channels (e.g., color, multi-spectral, hyperspectral), then a single band image can be extracted by selecting the green channel, or summing over a range of channels to provide high contrast between the retina lining and the blood vessels.

Figure 3:
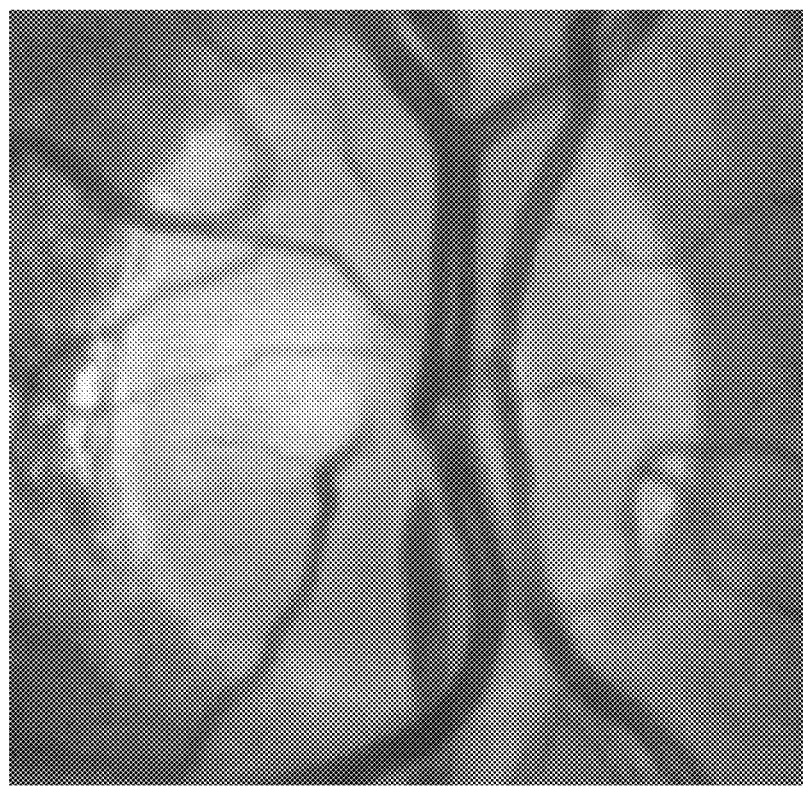
FIG. 3 is a picture of a high quality optic disc template.

A suitable method performs a normalized two-dimensional cross-correlation operation on the image under evaluation using a representative high quality image template of a typical optic disc, such as that shown in FIG. 3. This is one way to determine where (left, center, or right) the optic disc is located in the image under evaluation in order to determine field definition.

The sharpness of the peak of the output from the cross-correlation operation using the optic disc template is then evaluated. One method for this evaluation is to consider the height, and the slope and area of the main peak, but other methods are possible. If the peak is determined to be sufficiently sharp, then the location of the peak within the image is then considered. If the peak is on the right side of the image, then the image corresponds to the right eye, Field 2. If the peak is on the left side of the image, then the image corresponds to the left eye, Field 2.

If the cross-correlation peak is in the center of the image, then the image is of Field 1 and a further determination of the left or right eye is made. One way to do this is to calculate the mean intensities of areas on the right center and left center of the image under evaluation, using the fact that the macula is usually darker in the image. If the intensity on the left side is greatest, then the image is of the left eye, Field 1. If the intensity of the right side is greatest, then the image is of the right eye, Field 1.

If the cross-correlation peak is not sufficiently sharp, then the image is labeled as Field 3 and a further determination of the left or right eye is made, again using the fact that the macula is usually darker in the image. As above, one method is to compute the mean intensities of the left center and right center of the image under evaluation. If the left side intensity is higher, then the image is of the right eye, Field 3. If the right side intensity is higher, then the image is of the left eye, Field 3.

A suitable alternative method for field and side detection is applicable to relatively high quality images and proceeds following the binary vessel segmentation process described below. After obtaining the binary image corresponding to the blood vessel structure (prior to the thinning to centerline step), the densities of the left (d1), center (d2), and right (d3) regions of the binary image are computed. This method utilizes the density of the blood vessel structure present in the retina to determine the side and field. As one example of a specific implementation built on this structure, the following rules can be then applied to determine the side (OS or OD) and Field (1, 2, or 3):

| | |
|---|---|
| OD1: d2 >> d1, d2 >> d3 and d3 > d1 | OS1: d2 >> d1, d2 >> d3 and d3 < d1 |
| OD2: d3 > d2 and d3 >> d1 | OS2: d1 > d2 and d1 >> d3 |
| OD3: d2 > d1 and d1 > d3 | OS3: d2 > d3 and d3 > d1 |

Determining the quality of each identified image can be performed by analysis of the vessel symmetry of the eye in the identified image. A suitable analysis of the vessel symmetry can be performed by a vessel segmentation method.

The individual image quality assessment determines the quality of each image from the plurality of six retinal images. In accordance with a suitable method, first, the field images are processed to obtain a binary segmented image of the blood vessels. Second, features derived from this binary image are computed. Third, the image is assigned a quality level (1 to 5) using the features derived from the segmented vessel binary image, for example, by applying a classification algorithm.

Figure 4:
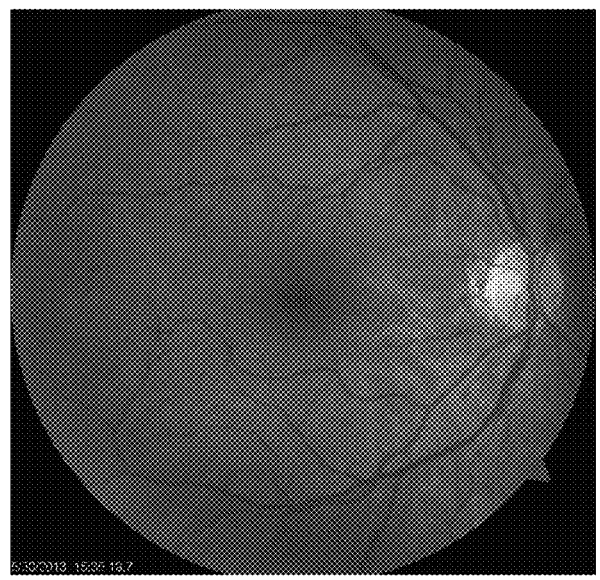
FIG. 4 is a picture of a retinal image illustrating a quality grade of 5.
Figure 5:
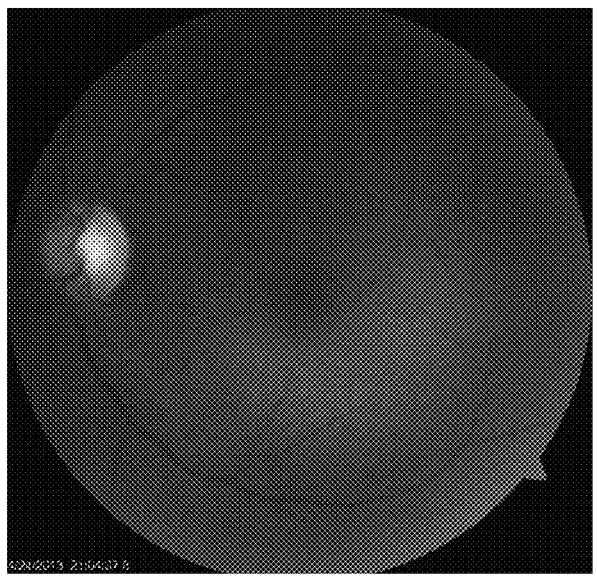
FIG. 5 is a picture of a retinal image illustrating a quality grade of 4.
Figure 6:
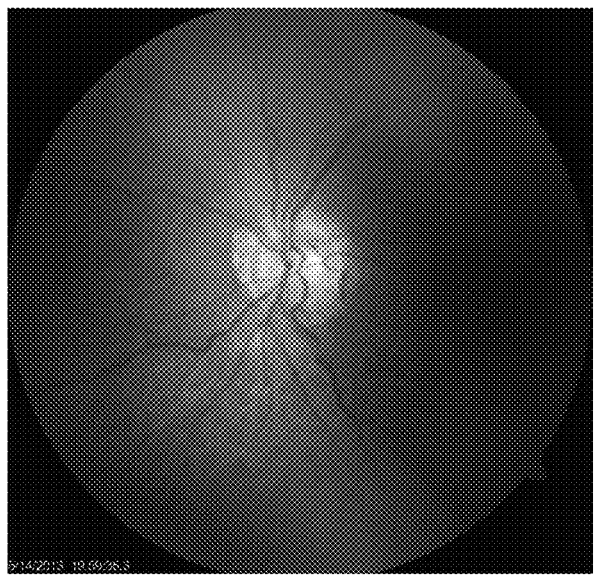
FIG. 6 is a picture of a retinal image illustrating a quality grade of 3.
Figure 7:
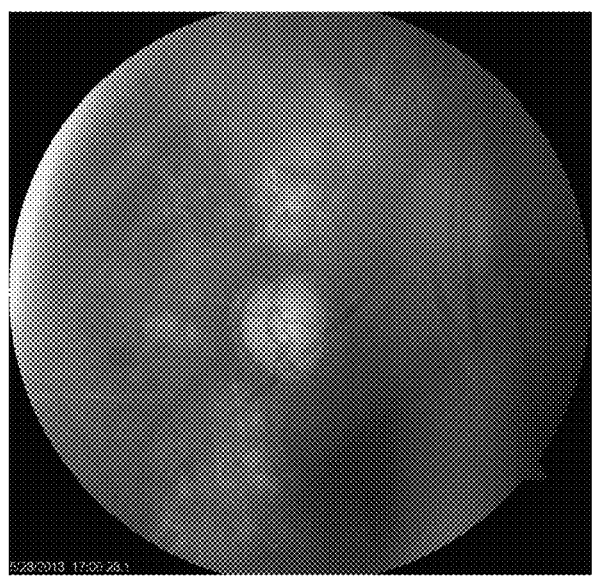
FIG. 7 is a picture of a retinal image illustrating a quality grade of 2.
Figure 8:
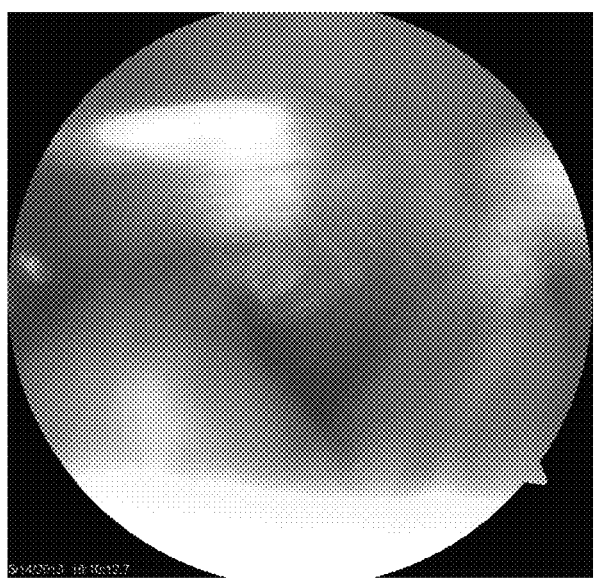
FIG. 8 is a picture of a retinal image illustrating a quality grade of 1.

A suitable system for assigning a quality grade to an image includes the ability to determine a passing grade or a failing grade based upon the data obtainable from the image. Suitable systems can include those which assign gradations of acceptable quality. For example, the system can assign a grade of from 1 to 5, with 1 being a failing grade and 2-5 being different degrees of passing grades. For example, a quality grade of 5 can be assigned to an image having no artifacts, good to excellent focus, and full retina visible within the field. A representative image is illustrated in FIG. 4 showing an example of a quality grade of 5, with no blocking of retinal detail, no artifact, and good overall focus. A quality grade of 4 can be assigned to an image having one artifact and/or a small portion of the retina blocked (less than 30%) or with good to fair focus. A representative image is illustrated in FIG. 5 showing an example of a quality grade of 4, with some portion of the retina blocked by artifact (in this case, uneven illumination) and good/fair focus. A quality grade of 3 can be assigned to an image having up to 50% of the retina blocked by artifact, and/or compromise of the image focus to the point where retinal detail is obscured. A representative image is illustrated in FIG. 6 showing an example of a quality grade of 3, with a larger portion of the retina blocked by artifact (both lashes and uneven illumination) and fair focus. A quality grade of 2 can be assigned to an image having up to 70% of the retina blocked by artifact and/or a severely compromised image focus. A representative image is illustrated in FIG. 7 showing an example of a quality grade of 2, with significant artifact blocking retinal detail (lashes, uneven illumination). A quality grade of 1 can be assigned to an image considered unreadable, with significant (more than 80%) of the retina blocked by artifact and/or compromised by severe focus issues, resulting in very little or no discernable retinal data. A representative image is illustrated in FIG. 8 an example of a quality rating of 1, which is considered to be unreadable due to significant artifact (over 80%) such that retinal detail is minimal or nonexistent.

A suitable binary vessel segmentation process proceeds as follows. First, an initial segmentation is performed by computing the Isotropic Undecimated Wavelet Transform (IUWT) of the image, and then threshold the sum of the lowest wavelet levels to produce the binary image. A suitable method includes that described in Bankhead P, Scholfield C N, McGeown J G, Curtis T M (2012) Fast Retinal Vessel Detection and Measurement Using Wavelets and Edge Location Refinement. PLoS ONE 7(3): e32435, the disclosure of which is incorporated herein by reference in its entirety.

A post-processing is applied to this binary image in preparation for the second stage. One approach for post-processing includes applying a median filter, removing connected objects that contain less than a fraction of the total image area, applying a morphological image dilation operation using a diamond structuring element, and then a thinning of the resulting structures to their centerlines. The post-processing is then completed by applying a circular mask to restrict the result to the retinal vessel structures.

Next, the vessel densities are computed and formed into a feature vector for the classification stage. A specific example for this is as follows. First, the image under evaluation is divided into 20 rectangular windows by dividing into a top and bottom half, and then dividing each of these into 10 equal sections left-to-right across the image. For each window, the Local Vessel Density (LVD) is computed as the number of non-zero pixels within each window. These LVD's are then normalized by the Global Vessel Density (GVD) computed as the number of non-zero pixels for a segmented binary image corresponding to a high quality level (level 5) image. A feature vector is then formed from the LVD's and the GVD for the image under evaluation.

The final stage is then the application of a trained pattern recognition classifier to label the quality level. One method for this is to use a set of Support Vector Machine classification algorithms. These SVM's are developed as one vs. all binary classifiers using training data derived from analyst-graded images. The final assignment of the quality level is then based on the output of the classifiers. Any form of classification algorithm known in the art for providing good discrimination among the quality levels may be used at this stage.

Assigning a comprehensive image quality metric to the set of images can be performed by image registration among the three field images associated with the same eye by analyzing overlapping areas of each of the three image fields and assigning a comprehensive score for the set of images associated with the eye. A comprehensive score can be calculated by registering the three field images associated with the eye into selected overlapping quadrants of the field images, assigning a quality metric to each non-overlapping quadrant and each overlapping quadrant and selecting the highest quality quadrant metric for each quadrant.

The comprehensive image quality assessment performs individual quality assessments of overlapping quadrants of the field images, and then selects the highest quality quadrant for each area and adds the score for each area and averages the total score to arrive at a comprehensive image quality assessment.

Figure 9:
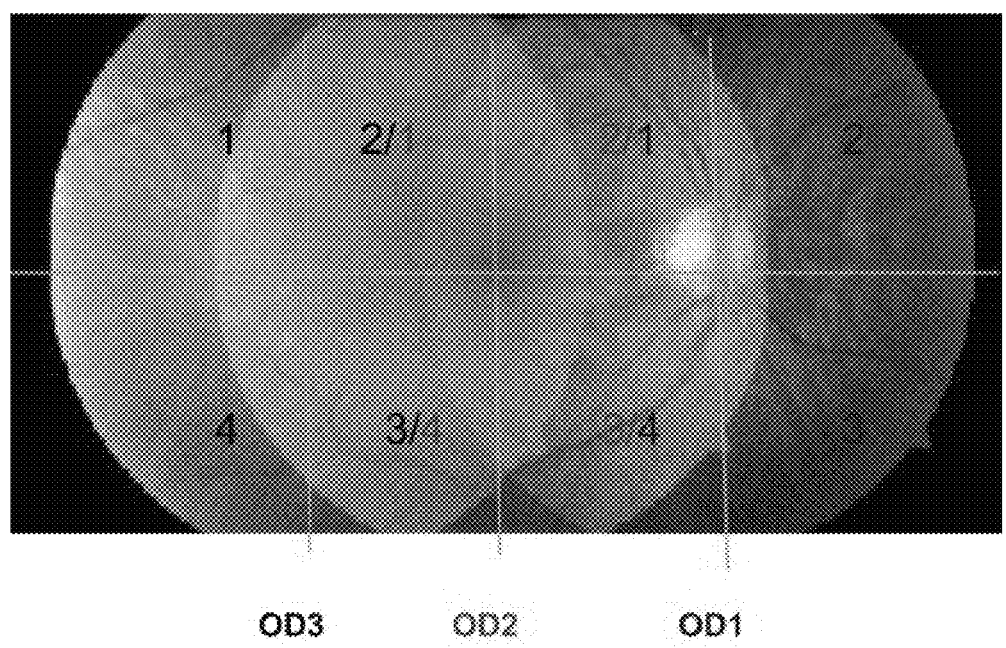
FIG. 9 is a picture of a set of overlapping fields of three retinal images.

An image registration among the three field images available for an eye is performed. An example of a suitable registration is shown in FIG. 9 illustrating a set of overlapping fields, where the image also indicates the division into eight quadrants, with the middle four representing overlapping areas of the retina imaged by two fields.

Features are extracted from each of the quadrants for use in the quality classification. One suitable method for this is to compute Local Binary Pattern (LBP) texture images, for example as set forth in Pietikainen, M. (2010), Local Binary Patterns, Scholarpedia, 5(3):9775, the disclosure of which is incorporated herein by reference in its entirety, for each overlapping quadrant of the vessel segmented binary images derived from the images under evaluation. Histograms, as estimates of the probability density functions, are then computed from these LBP images. A statistical distance measure between two distributions, such as the Kullback-Leibler Divergence (KLD), is then computed between the LBP histogram of the quadrant for the image under evaluation, and the LBP histogram of a high quality (level 5) vessel binary image corresponding quadrant. This KLD value and the Global Vessel Density (GVD) for that quadrant are then used to form a feature vector for the quadrant quality classification.

These feature vectors are then used in a trained pattern recognition classifier to classify the quadrant into one of the five quality levels. A suitable method is to use a Support Vector Machine (SVM) with a Radial Basis Function kernel. The highest quality level for overlapping quadrants is chosen as the quality for that quadrant and a quantitative comprehensive image quality assessment is made, with one example being the numerical average of the quality level for all quadrants in the set of field images.

In an embodiment, for an eye, three images of different overlapping fields are captured. These images are then registered to give a full fundus image. Even if a part of an image is degraded and the corresponding part in another overlapping image is good, sufficient information of the fundus can be obtained to determine a diagnosis. The method utilizes this overlapping property of the fields. As shown in FIG. 9 each field image is divided into 4 quadrants in clockwise order. Roughly, two quadrants are common for neighboring fields. For example, quadrant 2 of Field 3 and quadrant 1 of Field 2 are common. Each quadrant is treated as a separate entity during classification and is assigned a separate quality level jointly by a Certified Retinal Angiographer and an ophthalmologist. For each quadrant, following features were extracted: GVD-number of vessel pixels in the quadrant; and KLD of the normalized histogram of LBP of the quadrant from the corresponding quality 5 quadrant.

Class labels (quality levels) of the quadrants can be predicted using, for example, SVM with Radial Basis Function kernel. Maximum quality level for overlapping quadrants is taken. For example, if quadrant 2 of Field 3 has quality 2 and quadrant 1 of Field 2 has quality 5, then quadrant 2 of Field 3 will also be assigned with the highest quality, i.e., 5. Finally, the highest assigned quality levels of all the quadrants are averaged to give a final quality level for the set of 3 field images for an eye.

This method can be implemented in real-time hardware with on-board processing, or through computing cloud or cloud assisted processing in conjunction with the image acquisition system (camera). Alternatively, the method could be implemented through a smart-phone or tablet assisted, or even post-image acquisition such as part of an image archiving database system both at time of ingest or upon retrieval from the database.

A primary use of this method could be as part of the fundus imaging workflow in a clinical setting. A secondary use could be screening images from a retinal image database. The method also offers the capability of determining indicators of the cause of low quality image acquisition such as incorrect image focus, uneven illumination, presence of haze in the image, or artifacts due to eye lash interference. When implemented as part of an image capture workflow, these indicators, when associated with low quality images, may be used to provide feedback to the operator, including suggestions on how to resolve the above image quality issues.

There is a current practice of patients receiving screening for retinal diseases through the acquisition of fundus images of their retina. In many cases, the images are gathered by a trained operator and sent over a secure network for an ophthalmologist to later review. Sometimes the images are acquired with insufficient quality (e.g., out of focus) or mislabeled (wrong field) and these errors are not detected until after the patient has left the office. Thus, the patient has to be called back in for a second visit in order to receive the proper screening. This is particularly burdensome in rural or underserved areas where the return trip imposes a significant burden on the patient, or when the population being screened has a high rate of no-show or non-compliance.

Occasionally the errors may be detected and corrected real time by the trained fundus camera operator, but due to the absence of trained personnel in screening programs, many errors are discovered by the ophthalmologists during their evaluation. By automatically detecting the poor quality or mislabeled fields, the invention would save time and reduce the burden on patients by ensuring the necessary images are acquired during one visit. The images themselves would also act as a more appropriate, i.e., accurate patient record.

Images assessed in accordance with the above method to be of low quality at time of acquisition can be identified and flagged for re-acquisition. Features derived during application of the method can then be used as indicators for common acquisition artifacts. For example, intermediate sharpness of the optic disc cross-correlation output peak may indicate an out of focus condition for those fields where the optic disc is present. The lack of symmetry in the blood vessel structure or unusual vessel density could indicate uneven illumination or the presence of eyelash artifacts. Failure to successfully extract the vessel structure may indicate severe haze or cloudiness in the image. These characteristics obtained during the application of the method can be coded into the software to present feedback to the imaging camera operator on how to improve the quality of images and flag them for re-acquisition.

In an embodiment, the method can include a set of mathematical algorithms implemented in computer software, together with parameter settings, to automatically detect the required field and to assess the quality (on a scale of 1 to 5) of fundus images of the human retina based on several standard quality assessments and common artifacts. The method could be used in the fundus image acquisition workflow in a clinical setting to automatically detect images with insufficient quality. Acceptable images are used by an ophthalmologist to provide documentation and aid in the diagnosis of retinal disease. These images are captured either locally in the clinical environment, or remotely, in research applications and tele-medicine. The clinician could then retake the image while the patient is still available if necessary.

The basic approach could be adopted to assess the quality of other types of medical images. These include those obtained by radiologists and others practicing store and forward, and real-time medical imaging requiring a set standard of quality for interpretation. Future extensions of the method could be to provide real-time feedback to the fundus camera operator as to the minimum quality needed for the images. This software could be integrated into an existing fundus camera system (mydriatic or non-mydriatic) to provide feedback to the user real-time. After the image is taken, the system would evaluate the field and side to determine that the image matched the intended aim and internal/external fixation instruction. The system would also evaluate the individual quality of the image, in order to provide user feedback that the image is sufficient, or if it needs to be retaken. This feedback could be delivered within a few seconds after the image was captured, ensuring that the operator would know to re-attempt a particular image or field if the quality was not sufficient. The feedback could be customized to provide possible solutions to particular image and quality issues, such as "adjust focus" or "uneven illumination—move system slightly to the right" or "field mismatch—move fixation to ensure disc is in center of image". The system could evaluate the total patient record (three fields, both eyes) to determine overall image quality for each eye after both eyes were photographed with a mydriatic or non-mydriatic fundus camera system. This would provide the operator with an overall quality score for the patient, which could be utilized in reporting quality measures such as dilation or other potential barriers to optimum image quality. The system could be employed to review images after capture, such as those within large retinal image banks (such as those in clinical trials and other research or service activities relying on image quality sufficient to properly interpret for evidence of pathology, such as current teleophthalmology programs, for example, Eye-PACS (UC Berkeley, Calif.) in order to quantify quality measures for statistical use, reporting, and to ensure standard of care.

As illustrated herein, a system can include one or a plurality of user computing systems for collecting and deriving data, such as images, creating profiles from the data, storing the profiles and providing the profiles to third parties, although the system can include other types and numbers of systems, devices, and components that are configured in other manners. The present disclosure provides a number of advantages including providing an effective method and system for automated fundus image field detection and quality assessment. The system can store images, data and the like for the users, process requests, identify scores associated with each image selected for viewing or printing and providing each image and the associated data, although the system can perform other types and numbers of functions and there may be other numbers of systems.

The user computing system can be used in combination with a fundus or other cameras to analyze images, transmit one or more images from user to storage, providing a selection of one or more of the images for printing or viewing, and receiving the selected images, although other types and numbers of systems could be used and other types and numbers of functions can be performed by the user computing system. The system can include a central processing unit (CPU) or processor, a memory, user input device, a display, a printing device, and an interface system, which can be coupled together by a bus or other link, although each user computing system can include other numbers and types of components, parts, devices, systems, and elements in other configurations. The processor can execute a program of stored instructions for one or more aspects of the present disclosure as described and illustrated herein, although the processor could execute other numbers and types of programmed instructions.

The memory can store programmed instructions for one or more aspects of the present disclosure as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to one or more processors, can be used for the memory in the system.

A user input device may be provided in each of the user computing systems to input selections, such as to input one or more of the images, although the user input device could be used to input other types of data and interact with other elements. The user input device can include a computer keyboard and a computer mouse, although other types and numbers of user input devices can be used. The display in each of the user computing systems may show data and information to the user, such as the image fields and quality metrics of images by way of example only. The display can include a computer display screen, such as a CRT or LCD screen, although other types and numbers of displays could be used. A printing device can be used to print the selected images and associated data.

The interface system can be used to operatively couple and communicate with a single system or between each of the user computing systems and the receipt of images or profiles over a communication network, although other types and numbers of communication networks or systems with other types and numbers of connections and configurations to other types and numbers of systems, devices, and components can be used. By way of example only, the communication network can use TCP/IP over Ethernet and industry-standard protocols, including SOAP, XML, LDAP, and SNMP, although other types and numbers of communication networks, such as a direct connection, a local area network, a wide area network, modems and phone lines, e-mail, and wireless communication technology, each having their own communications protocols, can be used.

Although embodiments of the user computing system are described and illustrated herein, the user computing system can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems, microprocessors, digital signal processors, and micro-controllers, programmed according to the teachings of the embodiments, as described and illustrated herein, and as will be appreciated by those ordinary skill in the art.

In addition, two or more computing systems or devices can be substituted for any one of the systems in any embodiment of the embodiments. Accordingly, principles and advantages of distributed processing, such as redundancy and replication also can be implemented, as desired to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present disclosure as described and illustrated by way of the embodiments herein, as described herein, which when executed by a processor, cause the processor to carry out the steps necessary to implement the methods of the embodiments, as described and illustrated herein.

The disclosure will be further illustrated with reference to the following specific examples. It is understood that these examples are given by way of illustration and are not meant to limit the disclosure or the claims to follow.

Example 1—Protocol for Determining the Sufficiency of a Set of Fundus Images for Retinal Screening in the Diagnosis of Retinal Disease Acquire six color images corresponding to 3 fields of left (OS) and right (OD) eyes.
I. Field and Side Detection:
A) Perform normalized cross-correlation on each image with high quality template OD2 image using the green intensity channel;
Evaluate sharpness of peak in normalized cross-correlation by computing height (peak value), slope of the 100 largest coefficients, and peak area as the number of coefficients with values greater than or equal to 90% of the peak height. The cross-correlation is considered sharp if the height >0.5, the slope is >0.5, and the area of the peak is <0.001;
If sharp,
If location of peak on test image is on right, then OD2 (right side, Field 2);
If location of peak on test image is on left, then OS2 (left side, Field 2);
If location of peak is in center, it is OD1 or OD1 and check further;
Divide green channel image into thirds right to left, and ¼ to ¾ top to bottom; sum intensity in areas defined by middle section (top to bottom) on left (S1) and right (S2). If S1>S2, then OS1, if S1<S2, then OD1;
If not sharp, then label as Field 3. To determine OD3 or OS3;
Divide green channel intensity image into left and right halves, and ¼ to ¾ top to bottom. Sum intensity of middle section (top to bottom) on left (S1) and right (S2); and
If S1>S2, then OD3; if S1<S2, then OS3.
B) For high quality images with successful vascular structure extraction by vessel segmentation, use that binary image to determine side.
Perform vessel segmentation and result in binary image;
Divide vascular structure binary image into three equal regions, left to right, and calculate vessel density d1, d2, and d3, respectively, using the vessel segmentation method described below (through appling morphological image dilation) to produce a binary image and then estimating the density as the ratio of the number of non-zero pixels to total number of pixels in each region;
Determine side/field label by following rules:

| | |
|---|---|
| OD1: d2 >> d1, d2 >> d3 and d3 > d1 | OS1: d2 >> d1, d2 >> d3 and d3 < d1 |
| OD2: d3 > d2 and d3 >> d1 | OS2: d1 > d2 and d1 >> d3 |
| OD3: d2 > d1 and d1 > d3 | OS3: d2 > d3 and d3 > d1 |

II. Individual Image Quality Assessment:
A) Vessel Segmentation.
For the green intensity image of each image, apply Isotropic Undecimated Wavelet Transform (IUWT);
Select three lowest wavelet levels and sum up;
Threshold at 15-20% of lowest levels and produce binary image;
Apply 7×7 median filter to binary image;
Compute area of each connected object and remove those that contain less than 0.5% of the total image area;
Apply morphological image dilation using a diamond structuring element of size 7;
Thin resulting structures to centerlines; and
Apply circular mask to restrict result to retina vessel structure, as needed.
B) Vessel Density Computation and Symmetry Feature Extraction.
For each binary image resulting from the vessel segmentation above, divide into 20 rectangular windows by first dividing top and bottom halves, then dividing into 10 equal sections left to right;
For each window, the local vessel density (LVD) is calculated as the number of non-zero pixels within each window;
The LVD for each window is normalized by the Global Vessel Density (GVD) of a high quality (=5) image of the corresponding field; and
A resulting feature vector is then established as the concatenation of GVD, the 20 LVDs, 10 differences between corresponding top and bottom windows, and the difference between the sum of the top LVD's and the bottom LVD's.
C) Quality Classification.
Using a trained Support Vector Machine classifier with 5 quality classes compute the decision output for each 1 vs. all classifier for each image represented by the resulting feature vector; and Assign the image to the quality class with the highest decision output.
III. Comprehensive Image Quality Assessment:
Perform image registration to align overlapping areas of the three field images;
Label four quadrants for each field image as 1, 2, 3, and 4, from left to right and top to bottom;
Identify pairs of overlapping quadrants such as quadrant 1 from OD2 and quadrant 2 from OD3;
For each quadrant of each vessel segmentation binary image, extract a feature vector;
Compute the Local Binary Pattern texture image;
Compute the histogram of the LBP image;
Calculate the Kullback-Leibler Divergence (KLD) using the LBP histogram of the quadrant under test and the LBP histogram and a high quality corresponding quadrant;
Form feature vector as GVD for the quadrant and KLD;
Using a Support Vector Machine with a Radial Basis Function (RBF) trained on these features to predict a quality level (1 to 5) for each quadrant;
For each overlapping quadrant pair, select the maximum quality level; and
Compute a comprehensive quality assessment by taking the average of the quality levels over all quadrants.

Example 2

Figure 10:
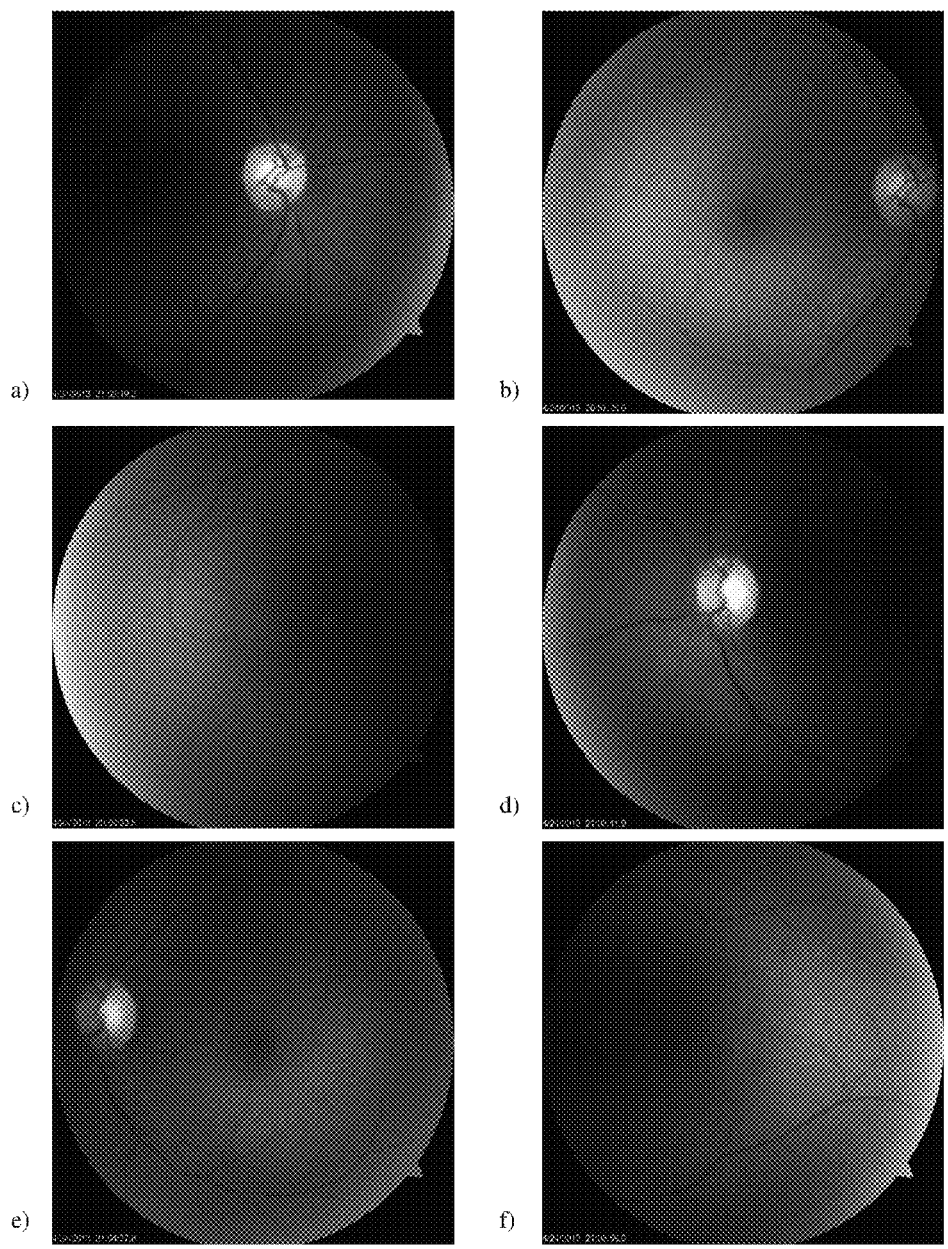
FIG. 10 is a picture of two sets of three retinal images of a patient from Example 2.
Figure 11:
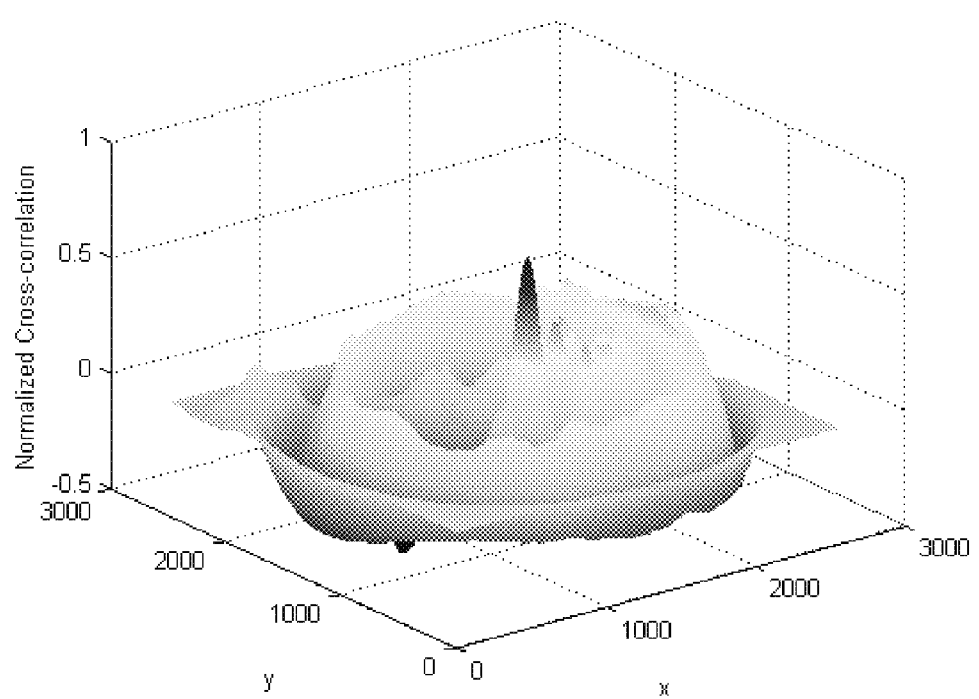
FIG. 11 is a two-dimensional surface plot generated from a retinal image from Example 2.

The six images (labeled a-f) shown in FIG. 10, were acquired from a single patient using a fundus camera. A normalized cross-correlation was performed by applying an optic disc template to each of the six images. The optic disc template used was representative of a high quality disc image. For each of the six images, a two-dimensional surface plot of the output of the normalized cross-correlation operation was obtained. FIG. 11 shows a two-dimensional surface plot of the output of the normalized cross-correlation operation applied to an image, in this case the image with the optic disc in the center. The sharpness of the peak of the cross-correlation output for each of the six images under consideration was evaluated. For this image set, images a, b, d, and e were determined to have sharp peaks, while images c and f were determined not to have sharp peaks.

For the images with a sharp peak in the cross-correlation output (a, b, d, and e), the position of the peak within the image is determined. Image b is determined to have its peak on the right side, thus it is labeled as OD2. Image e is determined to have its peak on the left side, thus it is labeled as OS2. Images a and d are determined to have their peak in the center, and thus are further evaluated by computing the average intensities on their left and right sides. Image a has higher intensity on the right, thus is labeled as OD1. Image d has higher intensity on the left, thus is labeled OS1.

Images c and f which do not have sharp peaks in the normalized cross-correlation outputs are identified as being Field 3, and thus are further evaluated by computing the average intensities on the their left and right sides. Image c has a higher intensity on the left, thus is labeled OD3. Image f has a higher intensity on the right, thus is labeled OS3. At this point all six images have been identified and the results are shown in Table 1.

TABLE 1

Result of identifying side and field for the six images.

| Image | Side and Field |
|---|---|
| a | OD1 |
| b | OD2 |
| c | OD3 |
| d | OS1 |
| e | OS2 |
| f | OS3 |

Next, the quality of the individual images is assessed. For each image the blood vessels are segmented by computing the IUWT, producing the binary image, applying a median filter, and applying a sequence of morphological image operations. The vessel density features are computed wherein the image under evaluation is divided into 20 rectangular windows by dividing into a top and bottom half, and then dividing each of these into 10 equal sections left-to-right across the image. For each window, the Local Vessel Density (LVD) is computed as the number of non-zero pixels within each window. These LVD's are then normalized by the Global Vessel Density (GVD) computed as the number of non-zero pixels for a segmented binary image corresponding to a high quality level (level 5) image. A feature vector is then formed from the LVD's and the GVD for the image under evaluation. These features are then input to an SVM individual quality assessment classification algorithm and a quality metric is computed for each image. Table 2 shows the results of the individual quality assessment for the six images.

TABLE 2

Result of individual quality assessment for the six images.

| Image | Quality Level |
|---|---|
| a | 3 |
| b | 4 |
| c | 2 |
| d | 3 |
| e | 4 |
| f | 4 |

The comprehensive quality of the set of three images for each eye is considered by first registering the overlapping three image set and then computing a quality metric for four quadrants within each image within the set. The four quadrants are numbered sequentially in a clockwise direction starting with the upper left. Features for each quadrant are computed and then used with an SVM classifier to assign a quality level for each quadrant.

Figure 12:
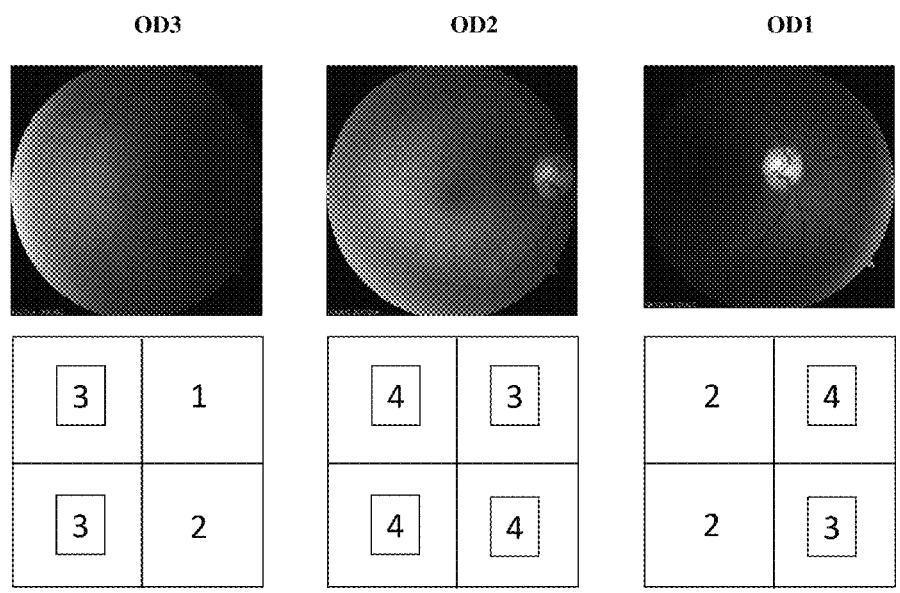
FIG. 12 is a picture of a set of three right eye retinal images showing comprehensive quality assessment from Example 2.

FIG. 12 shows the results of the comprehensive quality assessment for the right eye (OD) images. For image OD3 the quadrant quality levels are indicated as follows: upper left=3; upper right=1; lower right=2; and lower left=3. The corresponding quality levels of the quadrants for images OD2 and OD1 are similarly shown.

FIG. 12 shows OD images (top row) and the corresponding results of quality assessment for quadrants within each image (bottom row). The low quality level quadrants on the right side of OD3 and the left side of OD1 are replaced by the higher quality level quadrants of OD2 as indicated by the box surrounding the quality level. The left side of OD3 and the right side of OD1 do not overlap other fields and thus their quadrant scores are used in computing the comprehensive level. To compute the comprehensive image set quality metric, the scores of overlapping quadrants are compared and the maximum selected for the quadrant. For the set shown in FIG. 12, the two quadrants on the right side of the OD3 image overlap the two quadrants on the left side of the OD2 image. Similarly, the two quadrants on the left side of the OD1 image overlap the two quadrants on the right side of the OD2 image. Since the quality levels of the OD2 image are higher than the quality levels of the corresponding areas of the OD3 or OD1 images, the quadrant levels in the OD2 image are used to compute the comprehensive metric. The non-overlapping quadrant areas (left side of OD3 and right side of OD1) are combined with these and used to compute the comprehensive image quality metric as the average of the eight quadrants (identified by the scores surrounded by boxes in FIG. 12) covering the retina. For the OD images shown in FIG. 12, the eight scores average to a 3.5, which can then be rounded up to the final score of 4.

Figure 13:
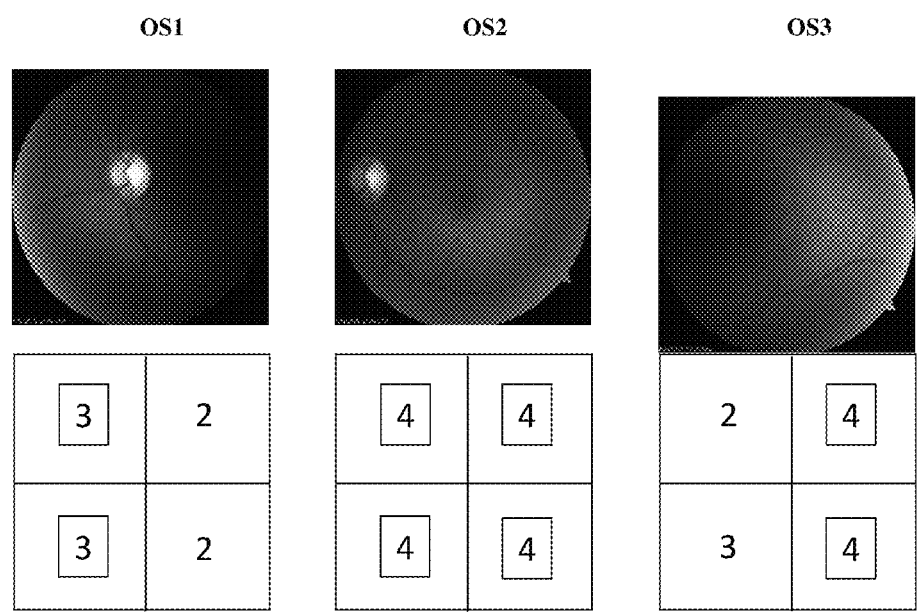
FIG. 13 is a picture of a set of three left eye retinal images showing comprehensive quality assessment from Example 2.

Similarly, FIG. 13 shows the images, quadrant quality scores, and the comprehensive score for the left eye (OS) images. FIG. 13 shows OS images (top row) and the corresponding results of quality assessment for quadrants within each image (bottom row). The low quality level quadrants on the right side of OS1 and the left side of OS3 are replaced by the higher quality level quadrants of OS2 as indicated by the box surrounding the quality level. The left side of OS1 and the right side of OS3 do not overlap other fields and thus their quadrant scores are used in computing the comprehensive level. In this case, the comprehensive score computed as the average of the boxed scores is 3.75, which can round up to 4. Thus, the comprehensive image quality metric for both OD and OS images shown in this example is level 4, even though some of the individual images had lower quality including some parts graded as non-readable (level 1).

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, or a combination thereof.

What is claimed:

1. A method for determining the sufficiency of a set of images for use in ocular screening, comprising:
    identifying the eye and field position of each image from a plurality of ocular images comprising a selected area of the eye;
    dividing each image into quadrants;
    determining the quality of each quadrant;
    evaluating the quadrants spanning the selected area to assign a comprehensive image quality metric for the selected area of the eye; and
    determining the sufficiency of the set of images based on the metric for rendering a medical diagnosis as to the presence and extent of ocular disease.

2. The method of claim 1, wherein the plurality of ocular images comprises a set of three image fields associated with the left eye and a set of three image fields associated with the right eye.

3. The method of claim 2, wherein the set of three image fields comprises a disc centered field, macula centered field, and temporal to macula field.

4. The method of claim 1, wherein the identifying is performed by determining where physiological landmarks are located in each image.

5. The method of claim 4, wherein the physiological landmarks comprise an optic disc and a macula.

6. The method of claim 1, wherein the determining is performed by analysis of the spatial symmetry of the blood vessel structure of the eye in the identified image.

7. The method of claim 6, wherein the analysis of the spatial symmetry is performed by a vessel segmentation method.

8. The method of claim 1, wherein the assigning is performed by image registration among the set of field images associated with the same eye by analyzing selected overlapping areas of each of the image fields.

9. The method of claim 8, wherein the comprehensive metric is calculated by assigning a quality metric to each area and selecting the highest quality metric for each overlapping area and averaging the assigned metrics.

10. A system for determining the sufficiency of a set of images for use in ocular screening, comprising:
    a processor which performs the actions comprising:
    identifying the eye and field position of each image from a plurality of ocular images comprising a selected area of the eye;
    dividing each image into quadrants;
    determining the quality of each quadrant;
    evaluating the quadrants spanning the selected area to assign a comprehensive image quality metric for the selected area of the eye; and
    determining the sufficiency of the set of images based on the metric for rendering a medical diagnosis as to the presence and extent of ocular disease.

11. The system of claim 10, wherein the plurality of ocular images comprises a set of three image fields associated with the left eye and a set of three image fields associated with the right eye.

12. The system of claim 11, wherein the set of three image fields comprises a disc centered field, macula centered field, and temporal to macula field.

13. The system of claim 10, wherein the identifying is performed by determining where physiological landmarks are located in each image.

14. The system of claim 13, wherein the physiological landmarks comprise an optic disc and a macula.

15. The system of claim 10, wherein the determining is performed by analysis of the spatial symmetry of the blood vessel structure of the eye in the identified image.

16. The system of claim 15, wherein the analysis of the spatial symmetry is performed by a vessel segmentation method.

17. The system of claim 10, wherein the assigning is performed by image registration among the set of field images associated with the same eye by analyzing selected overlapping areas of each of the image fields.

18. The system of claim 17, wherein the comprehensive metric is calculated by assigning a quality metric to each area and selecting the highest quality metric for each overlapping area and averaging the assigned metrics.

* * * * *